May 8, 1962 J. B. BECKMAN 3,033,155
INSTRUMENT ILLUMINATION
Filed March 9, 1959
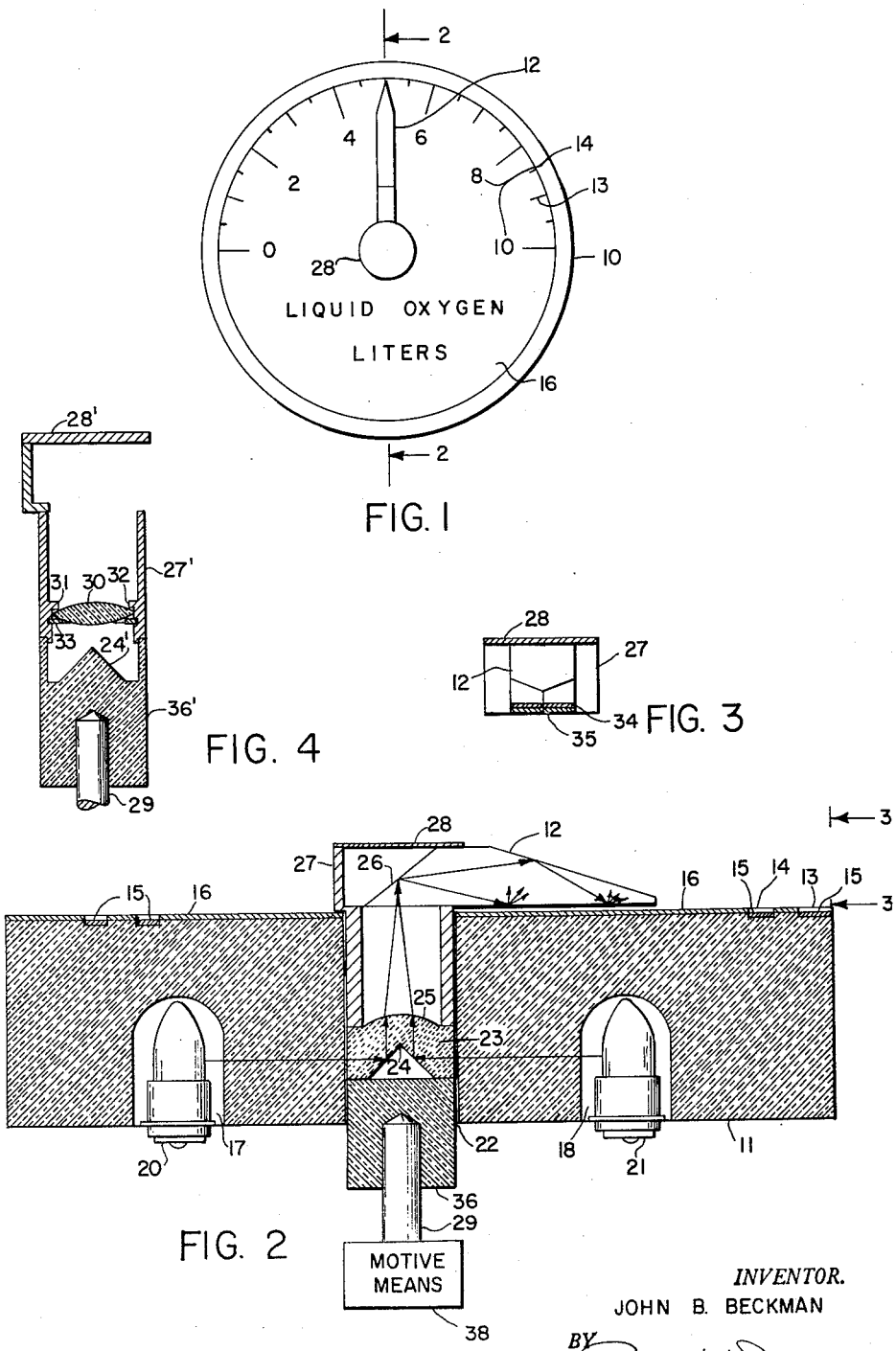
INVENTOR.
JOHN B. BECKMAN
BY Roger W. Jensen
ATTORNEY United States Patent Office 3,033,155
Patented May 8, 1962

3,033,155
INSTRUMENT ILLUMINATION
John B. Beckman, Coon Rapids, Minn., assignor to Minneapolis-Honeywell Regulator Company, Minneapolis, Minn., a corporation of Delaware
Filed Mar. 9, 1959, Ser. No. 798,232
10 Claims. (Cl. 116—129)

This invention relates to the field of instruments and more particularly to the field of illuminating instruments.

Specifically, this invention pertains to a means of obtaining a superior and more even distribution of light throughout a pointer on an illuminated instrument. One embodiment of this invention uses a piece of translucent material which is machined or otherwise processed on one end to provide a conical surface from which light is reflected and which may be processed on the other end to form a lens for converging light. The light is obtained from a source at one side of the translucent material and reflected so as to be transmitted through the converging portion of the translucent means. This translucent means is positioned with respect to a translucent pointer so that the light is converged to a point source on a reflecting portion of the pointer and from this point source the light is distributed evenly throughout the pointer.

Another embodiment of this invention uses a conical surface on the shaft portion to preferably reflect light through a separate translucent lens. The lens, when used in this embodiment, is separate from, but attached to, the body of the pointer.

In both embodiments the conical reflecting surface and lens rotate with the pointer and thereby provide for simplicity in design in that the lights can be stationary and still illuminate the pointer no matter which direction it is pointing. Also since the light is not a part of the pointer, the pointer can rotate a full 360 degrees since there are no wires to be twisted or tangled in the resulting apparatus. Furthermore in applications where it is required that the pointer be quite long, enough light can be obtained from the source while still keeping the components down to a respectably small size.

At the present time a class of materials which have the best light transmitting qualities in most instances have other disadvantages such as low temperature requirements. Another class of light transmitting materials are able to withstand much higher temperatures but are not as good conductors of light. With the advent of higher temperature requirements in airplanes, this invention enables the use of materials of the second mentioned class while still obtaining the necessary amount of illumination at the pointer and the evenness of illumination which is required.

It is a general object of the present invention to provide means for illuminating a dial face and pointer wherein the pointer and dial are uniformly illuminated.

It is another object of the present invention to provide a means of lighting an instrument pointer wherein a point source of light is created at a point in an instrument pointer.

It is still another object of the present invention to evenly illuminate a pointer of an instrument whereby the light source is located outside of the rotatable assembly by creating a point source of light in the pointer regardless of the rotational position of the pointer with respect to the light source.

It is yet another object of the present invention to light the dial face and pointer from a single source of light whereby means rotatable with the pointer are used to create a point source of light within the pointer.

These and other features of the invention will be understood more clearly and fully from the following detailed description and accompanying drawing in which:

FIGURE 1 is a front view of a typical dial structure employing the invention;

FIGURE 2 is a cross sectional enlarged view of FIGURE 1 through the section line 2—2, showing the lighting scheme;

FIGURE 3 is an end view of the pointer assembly as seen from the tip end through section line 3—3; and FIGURE 4 is a modification of the rotatable light transmitting assembly shown in FIGURE 2.

FIGURE 1 which shows the front view of an instrument has an instrument housing 10, a light conducting element 11, and a pointer 12. Light conducting element 11 is marked to form a dial face by an indicia 13, and associated numerals 14, around the periphery of the dial face as well as certain nomenclature describing what the instrument is indicating. Indicia 13 and numerals 14 are cut or etched into the light conducting element 11 which is made of a material such as Lucite or some other plastic material. The etched or cut away portions 13 and 14 of light conducting element 11 are coated with a matte-white paint 15. The top portion of the light conducting element 11 as shown in FIGURE 2 is painted with a non-specular black paint 16 so that the light is not transmitted to the face of the instrument except at the areas covered by the matte-white paint 15. Light conducting element 11 has a pair of openings or recesses 17 and 18 which contain a pair of bulbs or lamps 20 and 21 respectively, to furnish a source of illumination for the dial face through light conducting element 11, as well as pointer 12. Light is transmitted by lamps 20 and 21 through light conducting element 11 in all directions and light rays pass through element 11 into a central aperture 22. Situated in aperture 22 is a light transmitting member 23 which has a lower recessed surface that is in the shape of a cone 24. The cone 24 in light transmitting member 23 is created by cutting away the material on the bottom portion of light transmitting member 23. A surface of member 23 forms a cone 24 which is reflectorized or polished. Opposite the reflecting surface of cone 24, and axially aligned with the symmetrical axis of cone 24, is a converging lens 25 which converges the light rays reflected from cone 24. Light transmitting member 23 then contains both the reflectorizing cone 24 and lens 25. The lowermost portion of light transmitting member 23 is cemented or otherwise attached to a circular block portion 36 which forms a hub for a shaft 29. Shaft 29 is normally connected to a motor device, synchro, or some other motive means 38 to rotate the shaft and anything connected thereto. Converging lens 25 focuses the light rays to a point, and the point lies in a plane which is a bevelled surface 26 of pointer 12. Since the light rays are focused at a point on bevelled surface 26 of pointer 12, by polishing the bevelled surface of pointer 12, light will then be reflected from the bevelled surface into the light conducting material forming pointer 12. The bevelled surface 26 of pointer 12 is formed generally at an angle of 45 degrees with a base line on the bottom portion of pointer 12, however it may be varied to obtain the best possible illumination of pointer 12. Pointer 12 is formed in a wedge shape to gain the additional qualities of equal illumination over the whole pointer and this is further enhanced by painting the surface of pointer 12 that is adjacent to light conducting element 11, with a white matte paint 34 and then covering this with a black non-specular paint 35. This is better shown in FIGURE 3, in an end view as seen from the pointer tip. A cap or barrel 27 is cemented or secured to the outer periphery of light transmitting member 23 and is of the proper size and dimension to place bevelled surface 26 of pointer 12 at the focal point of lens 25. Cap 27 includes a cover plate 28, which is also cemented in place and covers the bevelled surface 26 of pointer 12 so that light is not transmitted towards the viewer in case surface 26 is not a perfect reflector.

From this description it may be seen that shaft 29 rotates the entire light transmitting element 23 and pointer 12 simultaneously and that no matter in which position pointer 12 may be radially positioned with respect to light conducting element 11, the illumination of pointer 12 will be evenly distributed over the entire area viewed by an observer. For the particular embodiment shown, a pair of lamps have been utilized, however, this may be varied to obtain the best results for any particular configuration. It will also be noted that only one light source is required to illuminate both the dial face and the pointer since a point source of light is made to appear on bevelled surface 26 of pointer 12.

FIGURE 4 shows another variation of the invention whereby cone 24' is formed as an integral part of block 36'. A lens 30 is held in position on the side opposite the cone by a pair of protrusions 31 and 32 within the barrel of cap 27'. Lens 30 is supported on the side adjacent the cone by a retaining ring 33 which is opposite the side having protrusions 31 and 32. For certain applications it may prove more satisfactory to use a construction of this type to carry out the teaching of the invention.

While I have shown and described a specific embodiment of this invention, the invention should not be limited to the particular form shown and I intend in the appended claims to cover all modifications which do not depart from the scope and spirit of the invention.

What I claim is:

1. Indicator illuminating apparatus comprising: a light source for emitting rays of light; a light conducting element having an aperture and forming the face of said indicator, said element having contained therein said light source adjacent to said aperture; a light reflecting member having a diameter smaller than said aperture of said light conducting element and located in said aperture, said reflecting member having a reflecting surface in the shape of a cone which is centrally located in said reflecting member for receiving said light rays entering said aperture and reflecting said light rays in a direction substantially ninety degrees from said light source; a converging lens for converging said reflected light rays to a focal point, said converging lens and said light reflecting member forming one integral part; a shaft adapted to be rotated and connected to rotate said light reflecting member; a pointer of light conducting material having substantially a wedge shape and a bevelled reflective surface on the large end of said wedge, said bevelled reflective surface disposed at the focal point of said converging lens to disperse said light rays evenly within said pointer regardless of its radial position with respect to said light conducting element; and an opaque light shield fixedly supporting and attaching said pointer to said light reflecting member and including means adapted to mask off said bevelled surface of said pointer.

2. Indicator illuminating apparatus comprising: a light source for emitting rays of light; a light conducting element having an aperture and having a portion forming the face of said indicator, said element having contained therein said light source; a light reflecting member located in said aperture having a reflecting surface in the shape of a cone which is axially located in said aperture for receiving said rays of light entering said aperture, and reflecting said rays of light in a direction substantially parallel to the axis of symmetry of said cone; a converging lens for converging said reflected light rays to a focal point; a mechanical connector for connecting said converging lens to said light reflecting member; a shaft adapted to be rotated and connected to said light reflecting member; a pointer of light conducting material having substantially a wedge shape and a bevelled reflective surface on the large end of said wedge, said bevelled reflective surface being disposed at the focal point of said converging lens to disperse said light rays evenly within said pointer regardless of its radial position with respect to said light conducting element; and an opaque light shield forming a part of said mechanical connector for fixedly supporting and attaching said pointer and including means adapted to mask off said bevelled surface of said pointer.

3. Instrument illuminating apparatus comprising: a light source for emitting rays of light; a light conducting element having an aperture and containing said light source therein; light transmitting means located in said aperture having a reflecting surface symmetrical about an axis which is coaxially located in said aperture for receiving said rays of light entering said aperture and reflecting said light rays in a direction substantially parallel to the axis of symmetry, and having a converging lens for converging said reflected light rays to a focal point; a shaft adapted to be rotated and connected to rotate said light transmitting means; a pointer of light conducting material having substantially a wedge shape and a bevelled reflective surface on the large end of said wedge, said bevelled reflective surface being disposed at the focal point of said converging lens to disperse said light rays evenly within said pointer regardless of its radial position with respect to said light conducting element; and an opaque light shield fixedly supporting and attaching said pointer to said light transmitting means to be rotated thereby, said shield including means adapted to mask off said bevelled surface of said pointer.

4. Apparatus for illuminating the movable portion of an indicator comprising: a light source for emitting rays of light; a light conducting element for conducting said rays of light away from said source; a reflective cone for reflecting light rays received from said light conducting element, said cone being centrally located within said light conducting element so that said light rays are reflected in a direction substantially parallel to the axis of symmetry of said cone; a lens receiving said light rays reflected from said cone for converging said rays to a focal point; a wedge shaped pointer of light conducting material having a bevelled reflective surface disposed at the focal point of said lens to disperse said light rays evenly regardless of its radial position with respect to said light conducting element; mechanical connector means connecting said lens in operable relationship with said reflective cone and said pointer, said connector means including means adapted to mask said bevelled surface of said pointer; and a shaft adapted to be rotated which is attached to said connector means.

5. Apparatus for illuminating the movable portion of an indicator comprising: a light source for emitting rays of light; reflecting means for reflecting light rays from said light source including means having the shape of a reflective cone centrally located within said reflecting means so that said light rays are reflected in a direction substantially parallel to the axis of symmetry of said cone; refracting means receiving said light rays reflected from said cone for converging said rays to a focal point; light conducting means having a bevelled reflective surface disposed at the focal point of said refracting means to disperse said light rays evenly regardless of its radial position with respect to said light source; holding means for holding said refracting means in operable relationship with said reflecting means and said light conducting means, said holding means including means adapted to mask said bevelled surface of said light conducting means; and means adapted to be rotated which is connected to said holding means.

6. Apparatus for illuminating the movable portion of an indicator comprising: a light source for emitting rays of light which are substantially parallel; reflecting means having a symmetrical shape for reflecting light rays from said light source so that said light rays are reflected in a direction substantially parallel to the axis of symmetry; refracting means receiving said light rays reflected from said reflecting means for converging said rays to a focal point; light conducting means having a bevelled reflective surface disposed at the focal point of said refracting means to disperse said light rays evenly regardless of its radial position with respect to said light source; holding means for holding said refracting means, said reflecting means and said light conducting means in operative relationship; and means adapted to be rotated which is connected to said holding means.

7. Apparatus to provide illumination for the movable portion of an indicator comprising: reflecting means having a symmetrical shape for reflecting light rays received from a light source so that said light rays are reflected in a direction substantially parallel to the axis of symmetry; refracting means receiving said light rays reflected from said reflecting means for converging said rays to a focal point; light conducting means having a bevelled reflective surface disposed at the focal point of said refracting means to disperse said light rays evenly regardless of its radial position with respect to said light source; and holding means for holding said refracting means, said reflecting means and said light conducting means in operative relationship, said holding means including means adapted to be rotated.

8. Illuminating means for an indicator comprising in combination: a rotatable elongated light transmitting pointer having a bevelled reflecting surface for reflecting light toward one end of said pointer; rotatable means including a light reflecting portion and a light converging portion for directing light from a remote source to the bevelled reflecting surface, the light reflecting portion of said means comprising a surface of revolution inclined at a constant angle with respect to the remote source and operable to reflect light from the remote source towards the light converging portion of said means, the light converging portion of said means operable to focus the light at a point lying substantially on the bevelled surface of said pointer; and holding apparatus connected to said pointer and to said means so that said pointer and said means rotate simultaneously.

9. Apparatus for illuminating the movable portion of an indicator comprising: a light source for emitting rays of light; reflecting means for reflecting light rays from said light source including means having the shape of a reflective cone centrally located within said reflecting means so that said light rays are reflected in a direction substantially parallel to the axis of symmetry of said cone; refracting means receiving said light rays reflected from said cone for converging said rays to a focal point; light conducting means having a bevelled reflective surface disposed at the focal point of said refracting means to disperse said light rays evenly regardless of its radial position with respect to said light source; holding means for holding said refracting means and said reflecting means in operable relationship with said light connecting means, said holding means including means adapted to mask said bevelled surface of said light conducting means; and means adapted to rotate said light reflecting means, said light conducting means, said holding means, and said refracting means.

10. A dial pointer assembly adapted for use with indirectly lighted instruments comprising: shaft means adapted to be rotated; reflector means rotating with and attached to said shaft means, said reflector means having a conical surface and having a predetermined diameter at the outermost portion of said conical surface; translucent means attached to said reflector means, said translucent means including a generally wedge-shaped portion and also including light distributing means adapted to distribute light throughout said generally wedge-shaped portion, said translucent means being of a thickness less than said predetermined outermost diameter of said conical surface; and reflective coating means attached uniformly on portions of said translucent means said reflective coating aiding said distributing means in the distribution of light within said generally wedge-shaped portion.

References Cited in the file of this patent

UNITED STATES PATENTS

| | | |
|---|---|---|
| 2,287,605 | Dickson | June 23, 1942 |
| 2,745,946 | Protzmann | May 15, 1956 |
| 2,761,056 | Lazo | Aug. 28, 1956 |
| 2,831,453 | Hardesty | Apr. 22, 1958 |
| 2,874,671 | Blackwell | Feb. 24, 1959 |
| 2,902,970 | Kadlec | Sept. 8, 1959 |
| 2,953,668 | Bassett | Sept. 20, 1960 |

FOREIGN PATENTS

| | | |
|---|---|---|
| 833,788 | Germany | Mar. 13, 1952 |